United States Patent
Wang et al.

(10) Patent No.: US 8,305,241 B2
(45) Date of Patent: Nov. 6, 2012

(54) KEYBOARD MODULE FOR AVOIDING ACCIDENTAL OPERATION

(75) Inventors: Shun-Lung Wang, Taipei (TW); Yen-Ting Liu, Taipei (TW); Hsing-Cheng Liu, Taipei (TW); Ming-Chih Huang, Taipei (TW); Chih-Min Huang, Taipei (TW); Po-Yang Shih, Taipei (TW); Chung-Jen Chung, Taipei (TW)

(73) Assignee: Asustek Computer Inc., Taipei (TW)

( * ) Notice: Subject to any disclaimer, the term of this patent is extended or adjusted under 35 U.S.C. 154(b) by 489 days.

(21) Appl. No.: 12/623,366

(22) Filed: Nov. 20, 2009

(65) Prior Publication Data

US 2010/0134329 A1     Jun. 3, 2010

(30) Foreign Application Priority Data

Nov. 28, 2008   (TW) ............................... 97146097 A

(51) Int. Cl.
*H01H 9/20* (2006.01)
*H03M 11/00* (2006.01)
(52) U.S. Cl. .................. 341/24; 200/43.11; 400/677
(58) Field of Classification Search .................. 341/24, 341/25; 200/43.02, 43.11, 43.13, 43.16, 200/43.18, 318, 322, 324, 327; 400/663–667, 677, 682, 473, 481

See application file for complete search history.

(56) References Cited

U.S. PATENT DOCUMENTS

| 3,906,814 | A | * | 9/1975 | Magnussen | ................ 200/43.18 |
| 5,735,390 | A | * | 4/1998 | Takagi et al. | .................. 200/344 |
| 5,793,605 | A | * | 8/1998 | Sellers | ........................... 200/345 |
| 6,281,812 | B1 |  | 8/2001 | Kim | |
| 6,887,002 | B1 |  | 5/2005 | Chen | |
| 7,221,561 | B2 | * | 5/2007 | Pan et al. | ................. 361/679.08 |
| 2004/0126170 | A1 |  | 7/2004 | Hagerman | |

FOREIGN PATENT DOCUMENTS

JP       05298000 A  * 11/1993
JP       11237944 A  *  8/1999

* cited by examiner

*Primary Examiner* — Howard Williams
(74) *Attorney, Agent, or Firm* — Muncy, Geissler, Olds & Lowe, PLLC

(57) ABSTRACT

A keyboard module for avoiding accidental operation keyboard module includes a key unit. The key unit has a pressing portion and a contacting portion. The pressing portion abutted the casing for the key unit not being pressed down. The pressing portion can be raised up to form a pressing distance relative to the casing via a push element controlled by a controlling switch to provide the pressing function. Therefore, the keyboard module can effectively prevent the users accidentally striking unnecessary keys during their operations or when the computer is in a power saving mode.

13 Claims, 11 Drawing Sheets

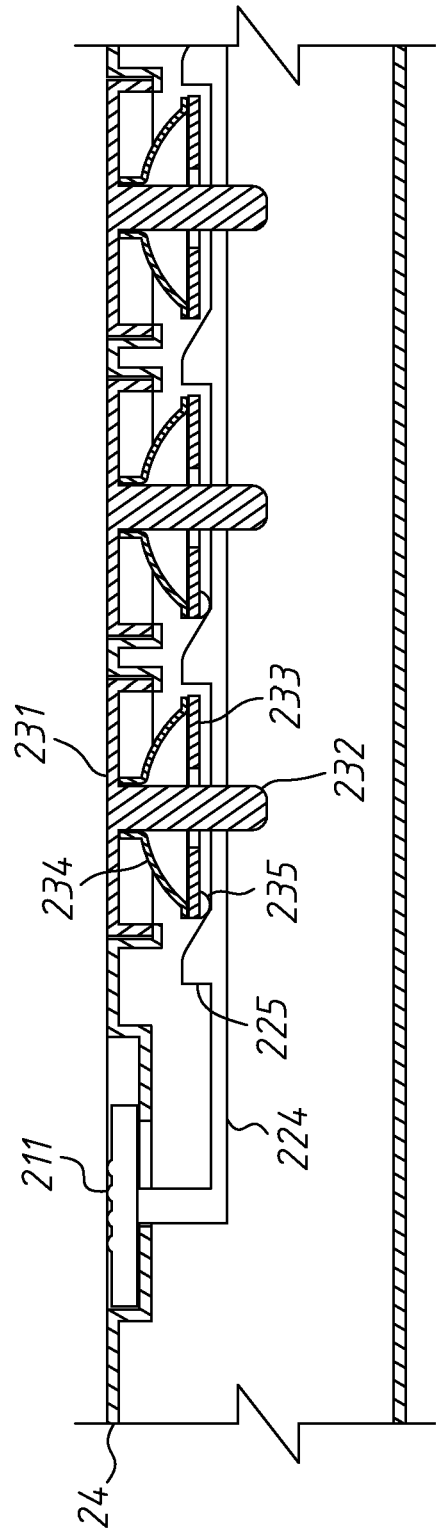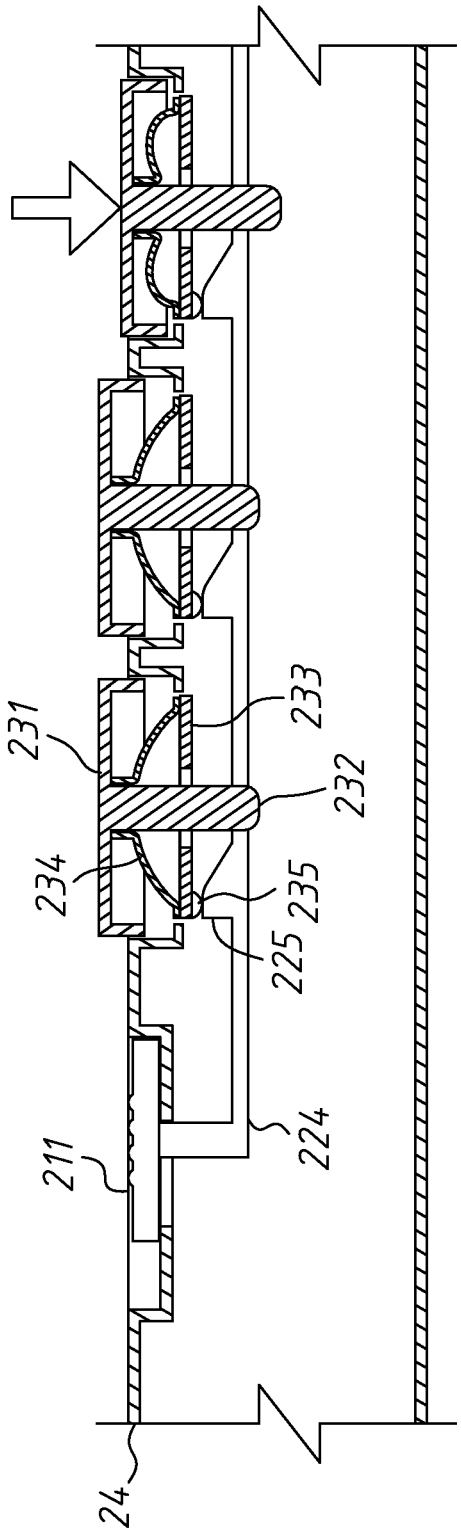

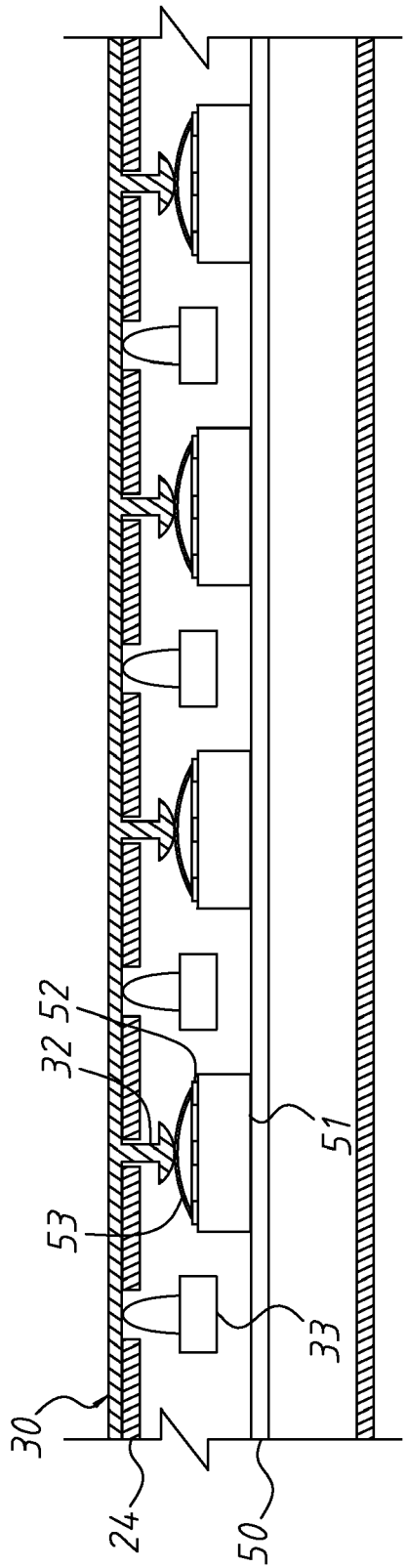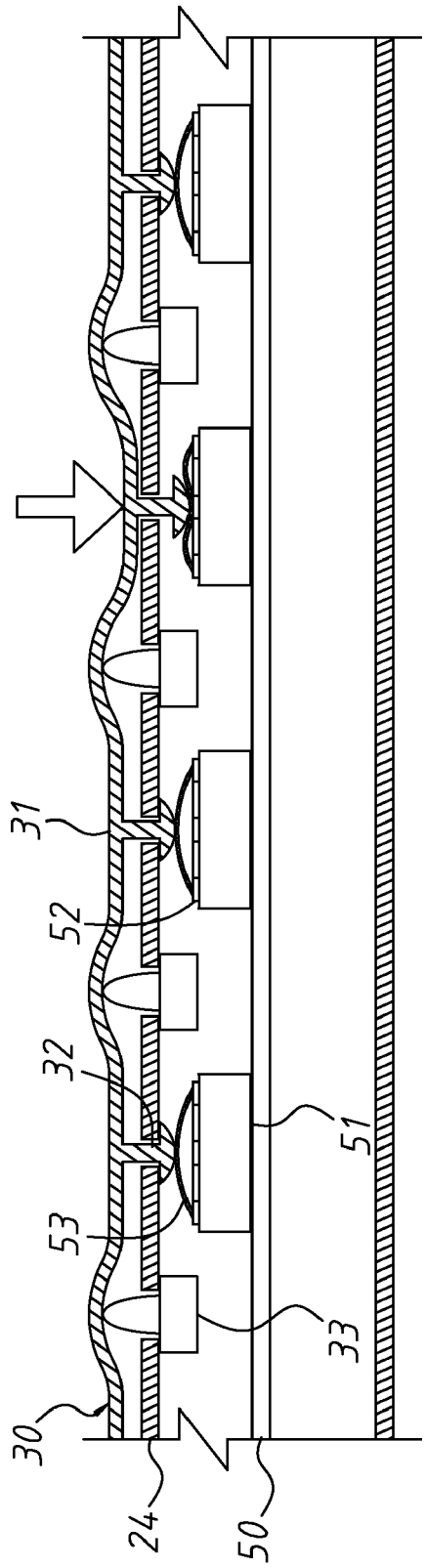
FIG. 7A
FIG. 7B

KEYBOARD MODULE FOR AVOIDING ACCIDENTAL OPERATION

BACKGROUND OF THE INVENTION

1. Field of Invention

The invention relates to a keyboard module, and more particularly, to a keyboard module for avoiding accidental operation.

2. Related Art

The electronic device such as the laptop and the desktop computer utilizes a keyboard module as an input interface for the users to input variety information and instructions into the electronic device. Generally speaking, the keyboard module includes multiple individual keys. The users activate functions or input words and symbols to the electronic device via pressing corresponding keys.

The keys are adjacent to each other, and the dirt and dust are accumulated in the space between keys. Therefore, the keyboard module becomes the dirtiest element of the computer hardware. To overcome this problem, the keyboard module is provided with a dustproof cover or a dustproof cushion. The dustproof cover is used for covering the keyboard module when the keyboard module is not used. The dustproof cushion envelops or covers the keyboard module to be pressed by the users. Therefore, directly touching the keyboard module and abrading the printed symbols on the keys are prevented. Furthermore, the dustproof cushion provides a shielding protection to the whole keyboard module to avoid the possibility of the accumulating dust between the keys.

Since users pay more and more attention to save usage space, the keyboard module is designed to be more and more compact and minimized. Therefore, the gap between the keys becomes small. However, the users often accidentally press two or three keys at a time because of the compact arrangement. For example, when the users are typing quickly on the keyboard, they would strike adjacent keys accidentally easily and the wrong words are input. In the meantime, when the users are playing games, they also may press adjacent keys which are wrong keys by accident and lost the games.

On the other hand, since the electronic device is still working in the power saving mode, the users may press wrong keys by accident to close executing programs, send messages to wrong contact person, and more seriously, it may disclose personal privacy information unintentionally or make important files damaged.

SUMMARY OF THE INVENTION

According to the keyboard module for avoiding accidental operation keyboard module disclosed in the invention, the keyboard module includes a casing, a plurality of key unit, a push element, and a controlling switch. Each key unit includes a pressing portion and a contacting portion extending downward. The pressing portion is disposed to abut the casing for the key units not being pressed down to prevent users pressing the key units by mistake to cause accidental operation. On the other hand, controlled by the controlling switch, the push element pushes up the key units to be raised up to form a pressing distance relative to the casing, which makes the pressing portion able to be pressed and drive the contacting portion to move downward to operate corresponding functions.

The key units can be designed with plurality of keycaps or with a single flexible panel. When the key units are not used, the keycaps or the flexible panel flatly abuts against the casing to maintain the whole appearance plane and disable the pressing operation of the users. When the key units need to be used, the key units are raised up, via the controlling switch, the users are provided with a normally pressing operation.

On the other hand, the key units corresponding to the keycaps or the flexible panel can be defined as a plurality of key groups to allow the users to operate in various modes. In a single mode, the corresponding key group of keys is raised up and other unnecessary keys would not be pressed by mistake.

The details and technical features of the present invention will be described in the following description and accompanying drawings.

BRIEF DESCRIPTION OF THE DRAWINGS

FIG. 4A and FIG. 4B are schematic diagrams showing a push element of the keyboard module for avoiding accidental operation keyboard module in the second embodiment of the invention;

FIG. 7A and FIG. 7B are schematic diagrams showing the keyboard module for avoiding accidental operation keyboard module in the FIG. 6B at the operation state in the invention.

DETAILED DESCRIPTION OF THE INVENTION

Figure 1:
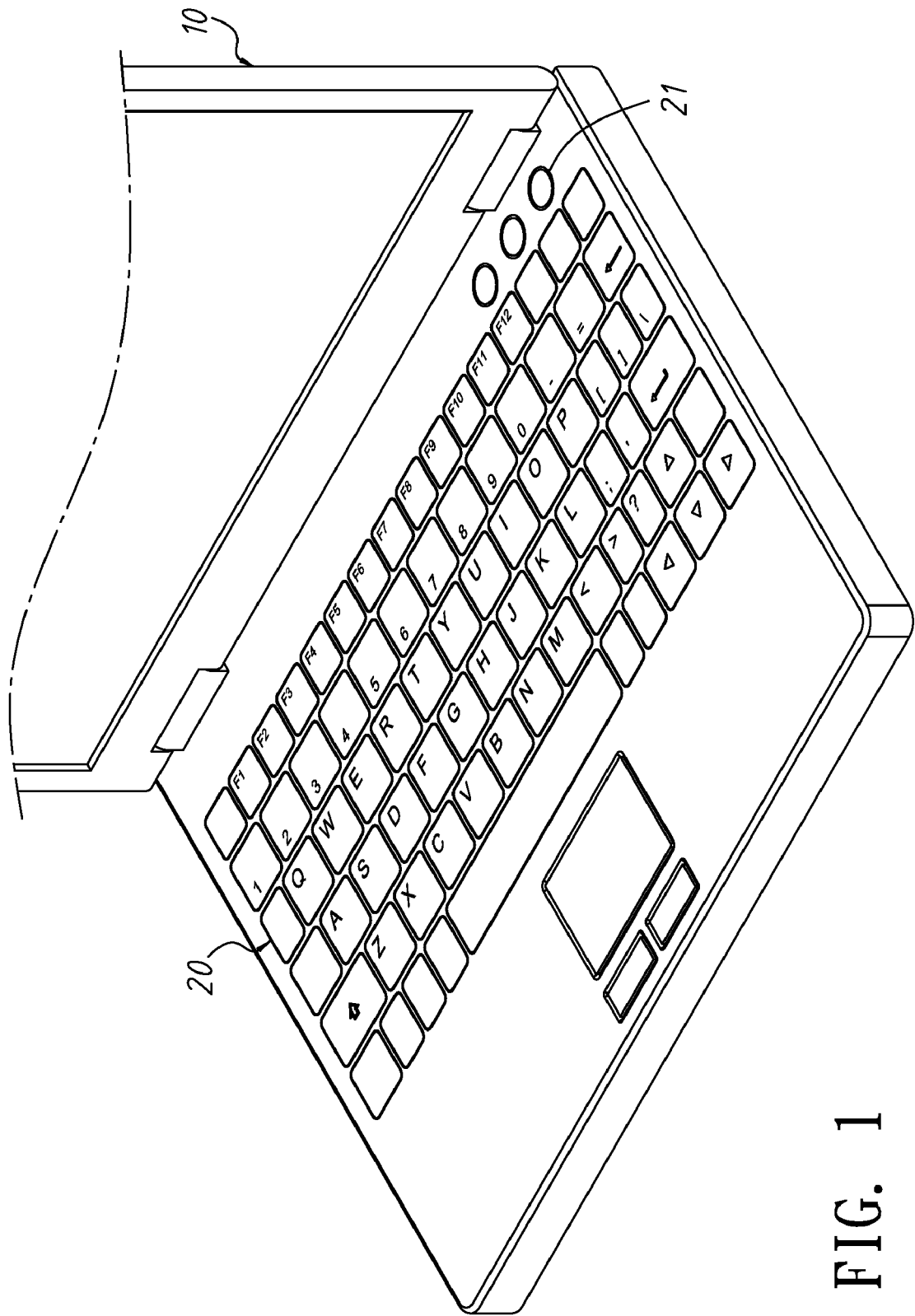
FIG. 1 is a schematic diagram showing a keyboard module for avoiding accidental operation keyboard module applied to a laptop in the invention.

FIG. 1 is a schematic diagram showing a keyboard module for avoiding accidental operation keyboard module applied to a laptop 10 according to the disclosure of the invention. The keyboard module 20 normally cannot be pressed by users. Therefore, when the laptop 20 is powered off, in a power saving mode, or unused for the moment, the key module can obtain an entire protection to avoid the accidental operation caused by touching the keyboard module 20 by mistake.

Figure 2A:
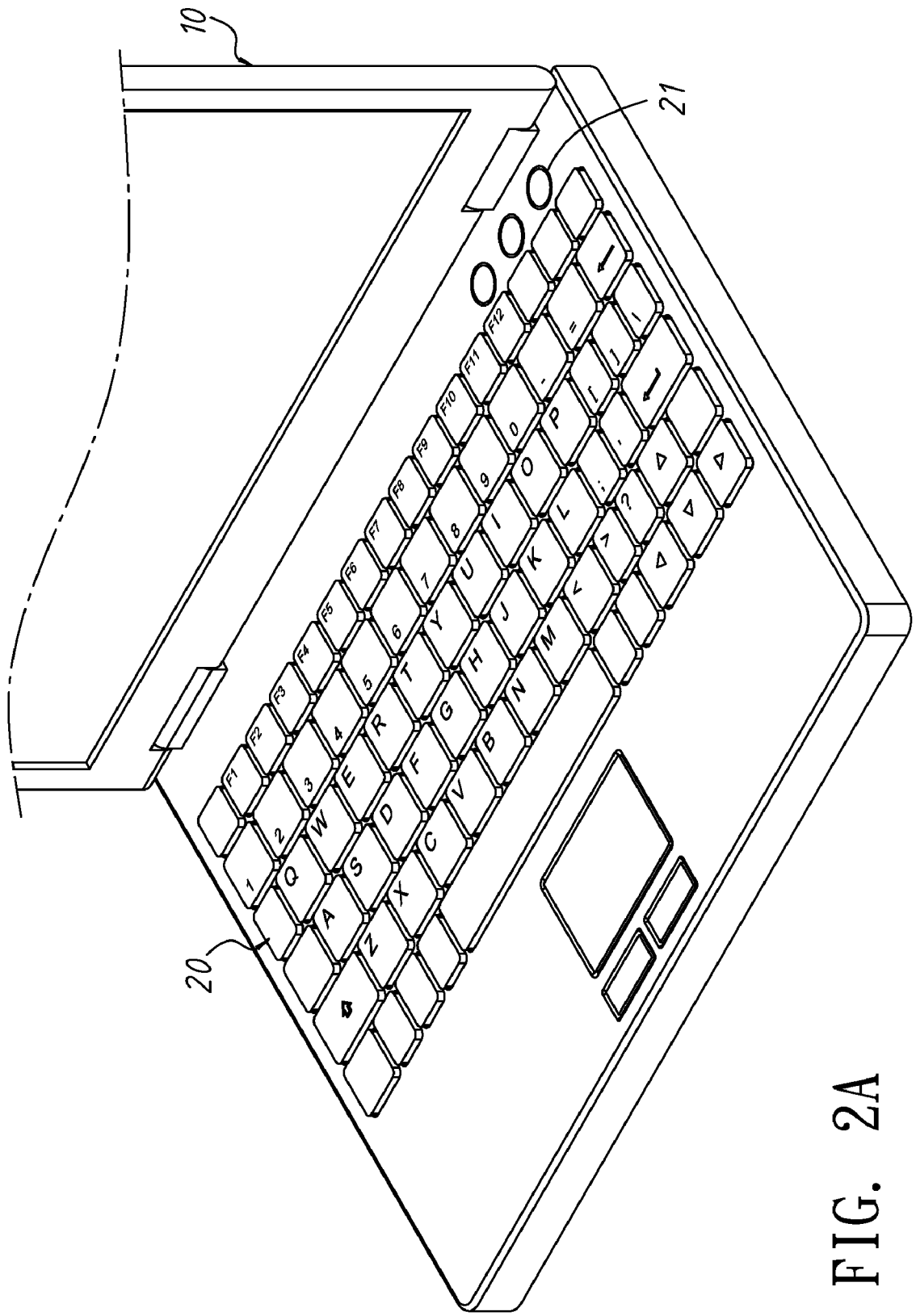
FIG. 2A~FIG. 2C are schematic diagrams showing the keyboard module for avoiding accidental operation keyboard module applied to a laptop in various modes in the invention.
Figure 2B:
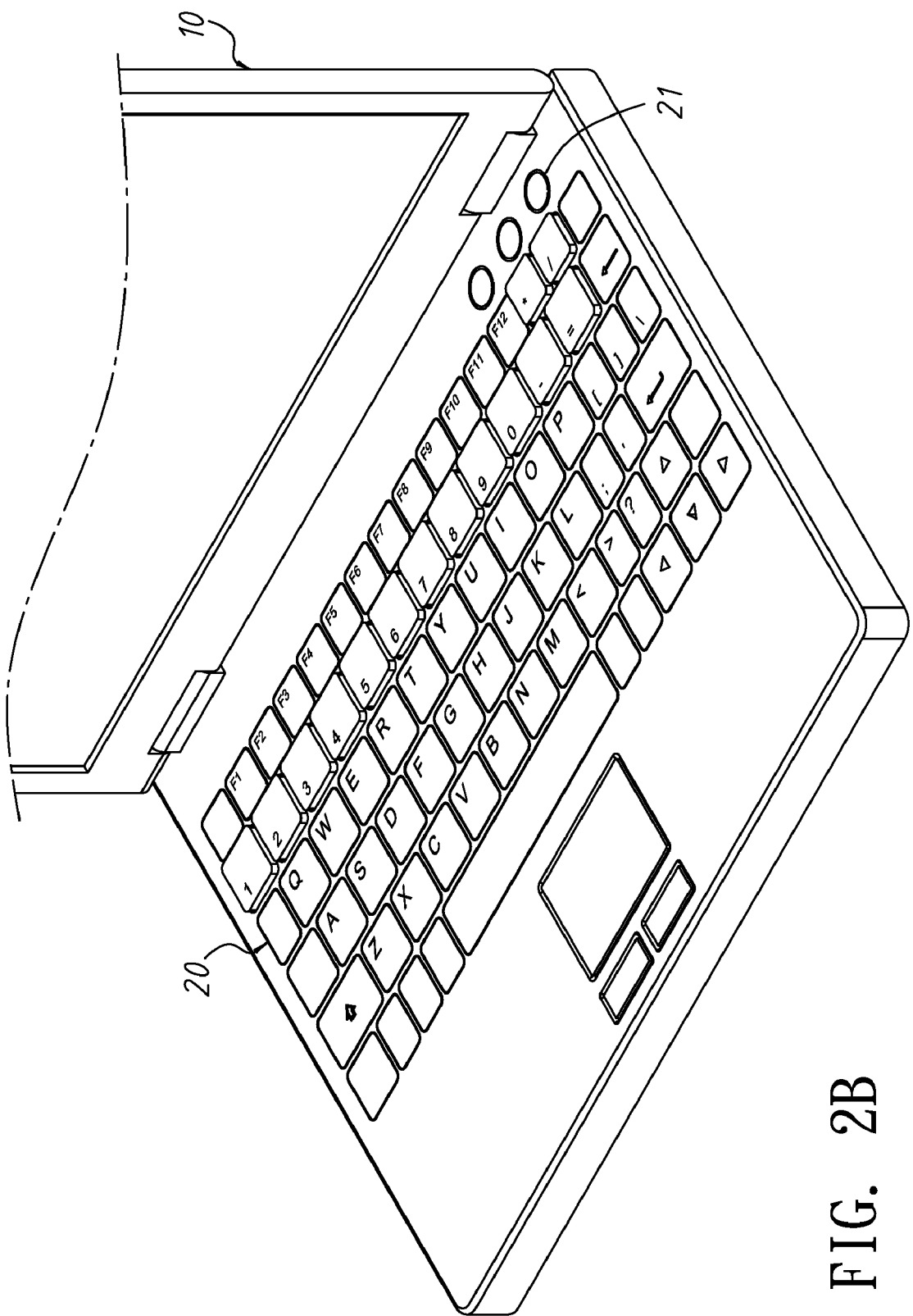
Figure 2C:
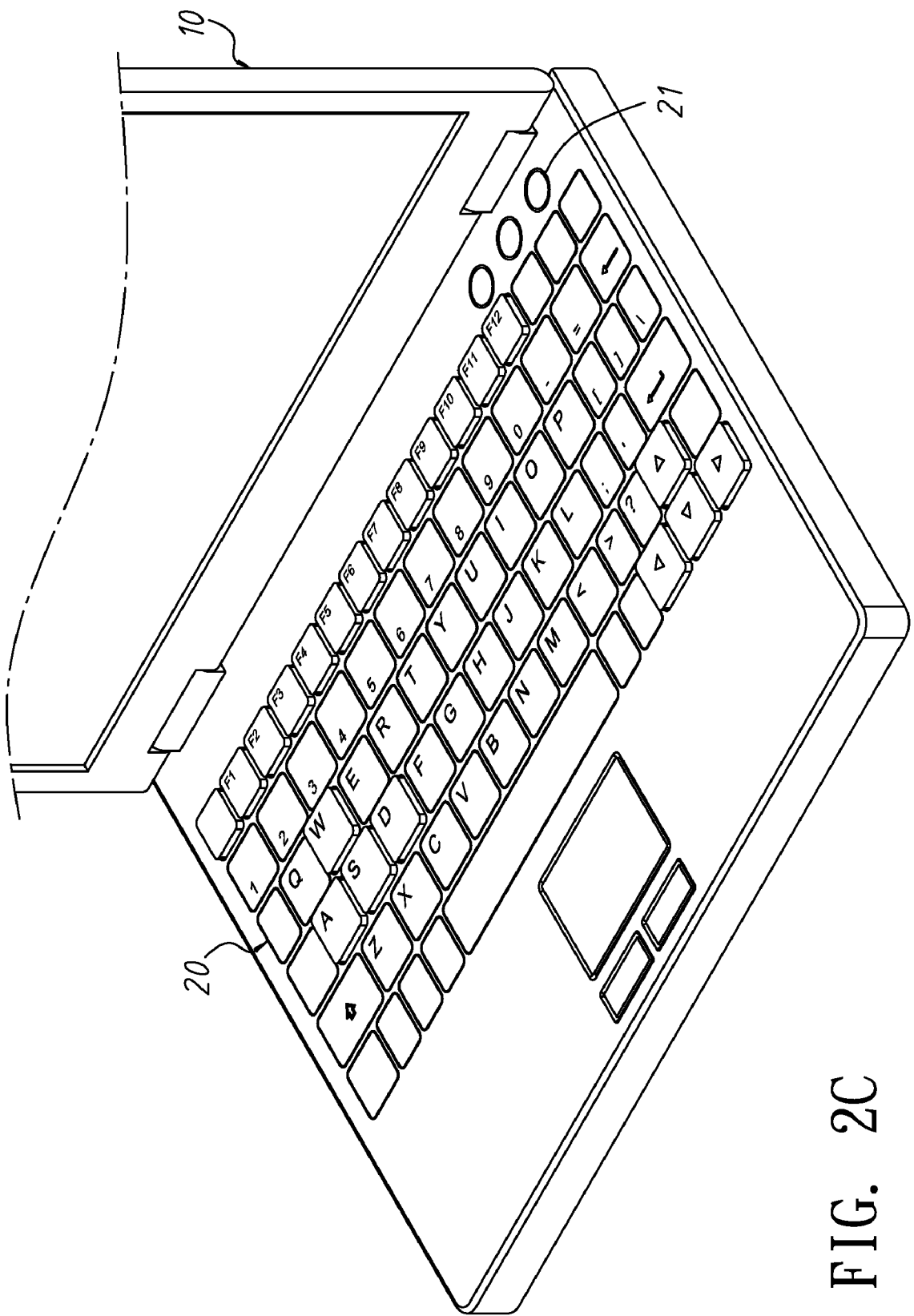

When the keyboard module 20 needs to be used, it is controlled by a controlling switch 21 to be raised up for a user to operate. To meet the users' demands, the keyboard module 20 provides many operation modes for preventing unnecessary keys being pressed by mistake. For example, a normal operating mode is raised up all keys (See FIG. 2A), a number keys operating mode is raised up only number keys (See FIG. 2B) and a special operating mode is raised up special keys for software like games software (See FIG. 2C). Grouping the keys prevents the users touching other unnecessary keys by mistake. For example, when the users play computer games, some keys to be operated are raised up and other unnecessary keys keep plane and unable to be pressed. Therefore, even if the keyboard module 20 decreases in size to meet the space demand, other keys would not be pressed by mistake and the operation would not be affected. The above operation modes are just described as examples accompanying drawings. The operation mode also can be changed, even users may define the keys to be raised by themselves.

Figure 3A:
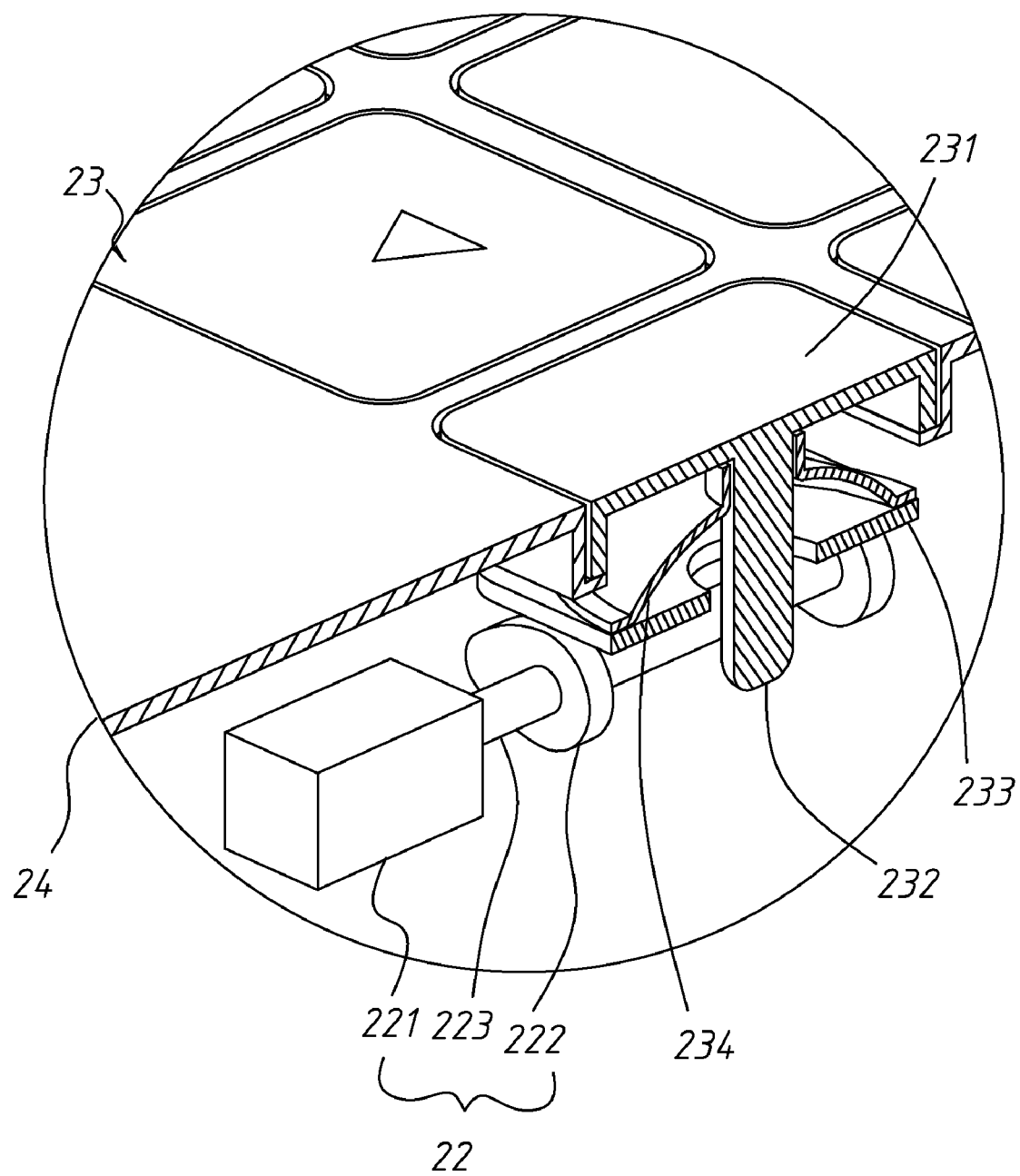
FIG. 3A and FIG. 3B are a schematic diagrams showing a push element of the keyboard module for avoiding accidental operation keyboard module in the first embodiment of the invention.

The keyboard module 20 includes a controlling switch 21, a push element 22, a plurality of key unit 23, and a casing 24, please see FIGS. 3A and 4A. FIG. 3A shows the first embodiment of the push element 22 in the invention. The push element 22 includes connecting rods 224 and 226. The connecting rods 224 and 226 have multiple sliding blocks 225 and 227 with inclined surfaces respectively. The bottom plate 233 of the key units 23 have a projection dot 235 corresponding to the inclined plane surface, and the bottom of a circuit board 50 has a corresponding projection dot 54. Meanwhile, the controlling switch 21 may be a push button 211. The key units 23 as shown in FIG. 3A is the same as the conventional keyboard including multiple keycaps. Each of the keycaps includes a pressing portion 231 and a contacting portion 232 which extends downward from the pressing portion 231.

Figure 3B:
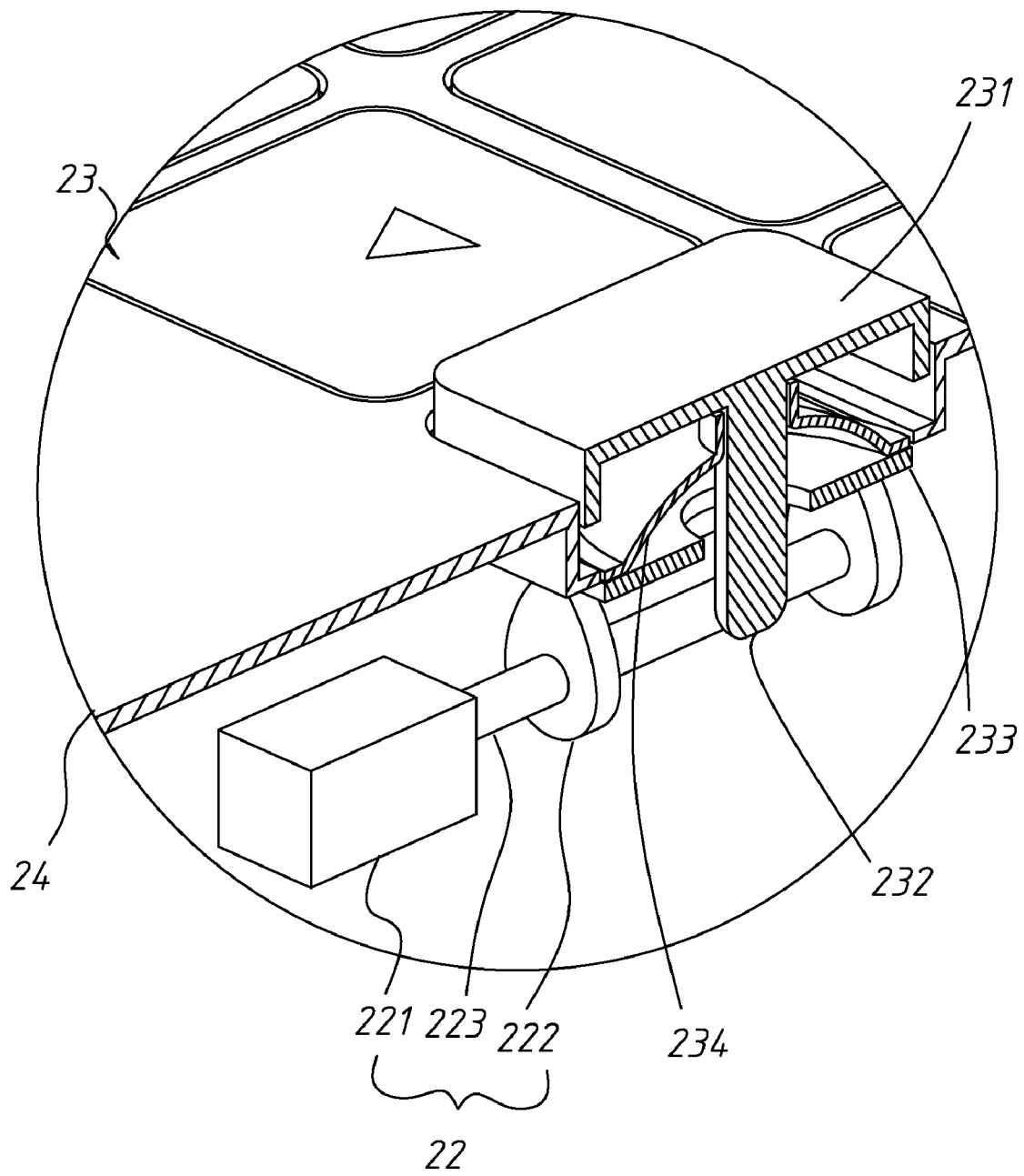
Figure 5:
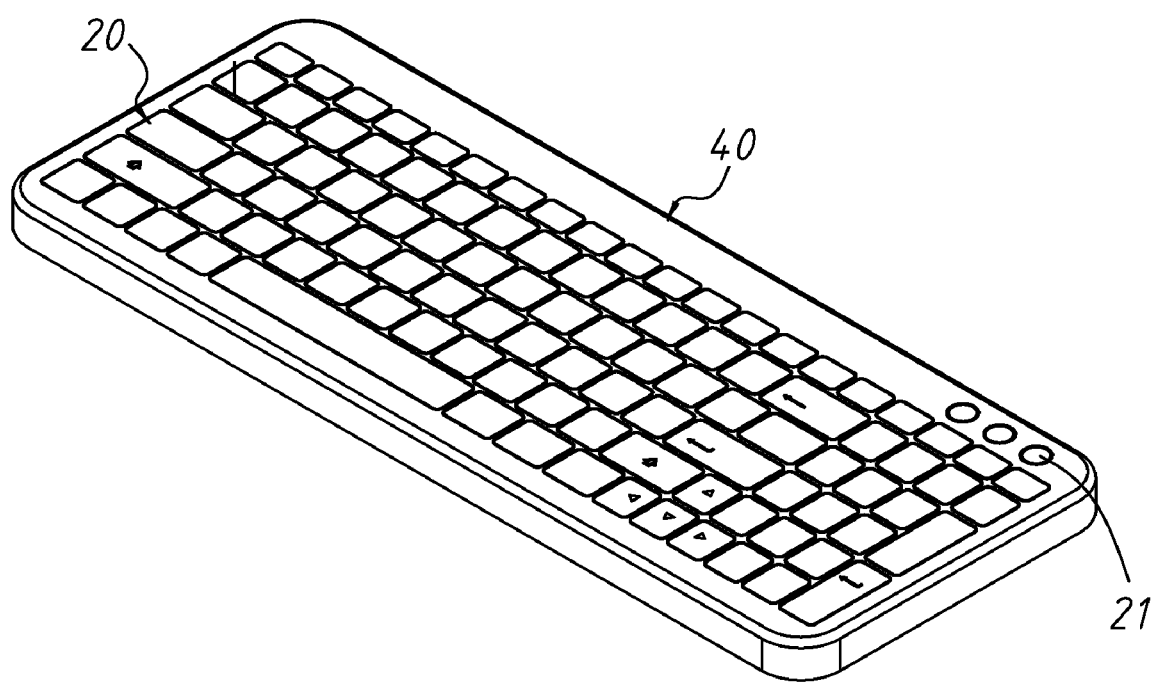
FIG. 5 is a schematic diagram showing the keyboard module for avoiding accidental operation keyboard module applied to a desktop computer in the invention.

As shown in FIG. 3A, the pressing portion 231 is assembled against the casing 24. At that moment, the contacting portion 232 does not contact the key switch 51 of the circuit board 50. No gap exists between the key units 23 and the casing 24, and therefore, the key units 23 are unable to be pressed by the users and the accidental operation is avoided. Then, as shown in FIG. 3B, when the key units 23 need to be used, pushing the push button 211 rightwards can drive the sliding blocks 225 and 227 with the inclined surfaces on the connecting rods 224 and 226 to move rightwards. At the same time, the projection dot 235 of the bottom plate 233 moves along with the inclined surface of the sliding block 225, and further the pressing portion 231 and the contacting portion 232 are raised up to form a pressing distance. Meanwhile, the projection dot 54 of the circuit board 50 is raised up along with the inclined surface of the sliding block 227.

The relative positions of the contacting portion 232 at the bottom of the key units 23 and the flexible dome 53 at the top of the key switch 51 are not changed. However, the key units 23 are raised up to form a pressing distance, the users may move the contacting portion 232 at the bottom to press the flexible dome 53 via pressing the pressing portion 231 of the key units 23 to trigger the key switch 51. Users may activate relatively functions and input corresponding words and symbols. A flexible bracket 234 and the flexible dome 53 can further provide resilience to the pressing portion 31 and the contacting portion 32 to restore the position of the key units 23.

Moreover, the height of the sliding block 227 on the connecting rod 226 below the circuit board 50 may be made greater than the height of the sliding block 224 on the connecting rod 225 below the key units 23. The raising distance of the circuit board 50 is greater than that of the key units 23 to ensure the pressing portion 231 can trigger the key switch 51 after the raising process. As showed in the FIGS. 3A and 3B, the connecting rod 224 has multiple sliding blocks 225 with the inclined surfaces, and therefore, the connecting rod 224 can control the plurality of key units 23 to be raised up at a time. The key units 23 may be controlled according to the defined a plurality of key groups of the keycaps mentioned above. For example, a single push button 211 is used to control a key group of the keycaps up and down. A single connecting rod 224 with a sliding block 225 with the inclined surface also can be used to control a single keycaps.

Besides the mechanical push element mentioned above, the push element 22 driven by electricity can also be used. FIGS. 4A and 4B are schematic diagrams of the second embodiment of the push element 22. The push element 22 is a type of a motor module and includes a motor 221, a shaft 223 connecting with the motor 221, and cams 222 and 228 disposed on the shaft 223. When the key units 23 need to be used, the controlling switch 21 controls the motor 221 to drive the shaft 223 to rotate, and then the cams 222 and 228 on the shaft 223 are driven to rotate. The cam 222 pushes the bottom plate 233 below the key unit 23 upwards, and the bottom plate 233 pushes the flexible bracket 234 upward to raise the pressing portion 231 and the contacting portion 232 up to form the pressing distance which is equal to the pressing distance of the conditional keys. At the same time, the cam 228 raises up the circuit board 50. The users can press the pressing portion 231 to make the contacting portion 232 to contact the key switch 51 of the circuit board 50 in the laptop 10 to activate relative functions or input words and symbols. The motor 221 may be a step motor, a servo motor, or a micro-motor made by the micro-electronic mechanical system (MEMS) technology, and the shape of the cam 222 can be changed according to the pressing distance needed to raise the pressing portion 231 up. Besides the mode of driving a single keycap as shown in FIG. 4A and FIG. 4B, the motor 221 also can drive a key group of the keycaps as shown in FIG. 3A and FIG. 3B.

The controlling switch 21, besides the push button 211, also may be a press switch or a touch switch, or it may be realized by a part of the keys, combined function keys or software. On the other hand, the keyboard module for avoiding accidental operation keyboard module disclosed in the invention also can be used in the external keyboard of a desktop computer to reach the same effect.

Figure 6A:
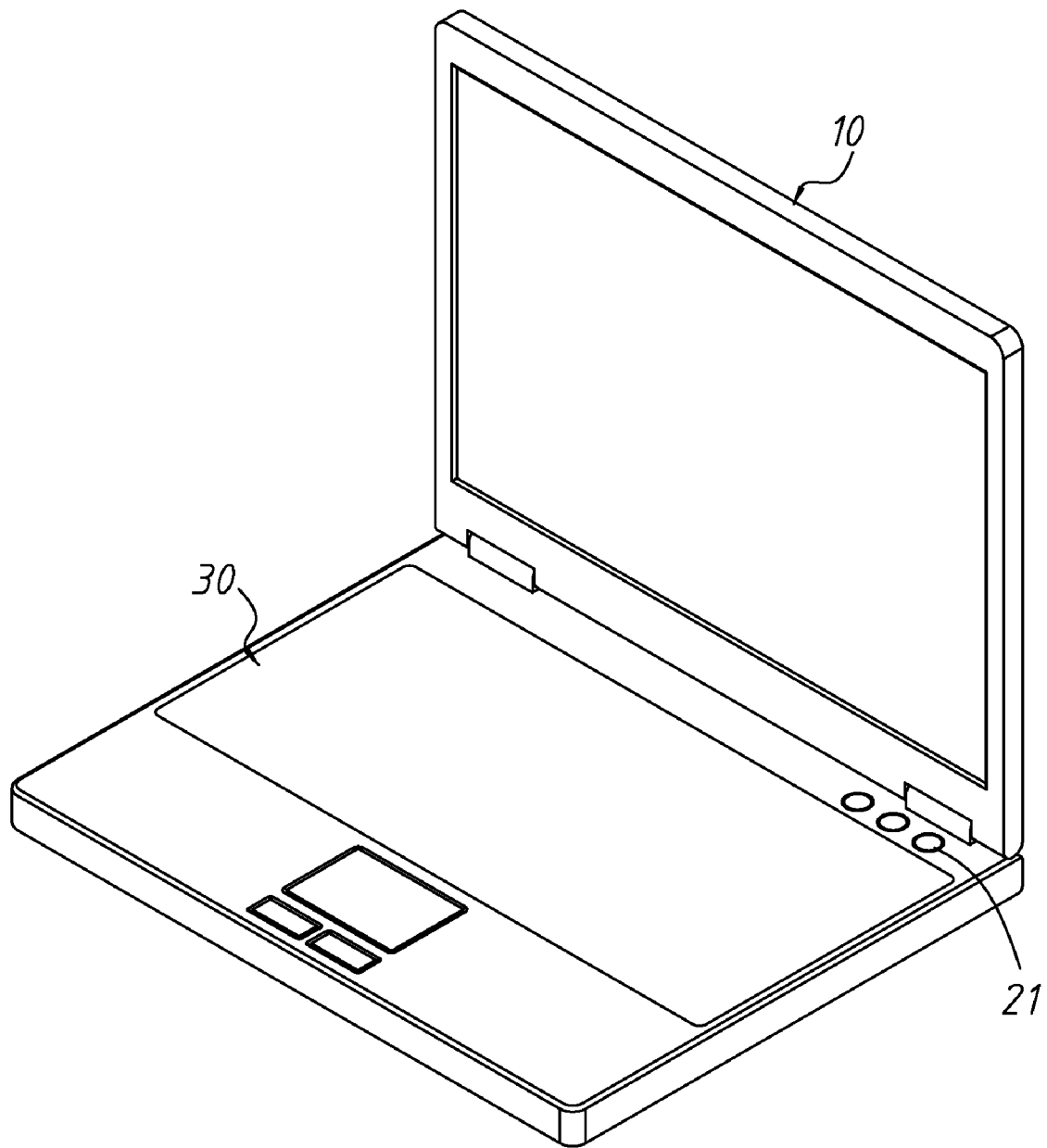
FIG. 6A and FIG. 6B are schematic diagrams showing the keyboard module for avoiding accidental operation keyboard module applied to a laptop in another embodiment of the invention.
Figure 6B:
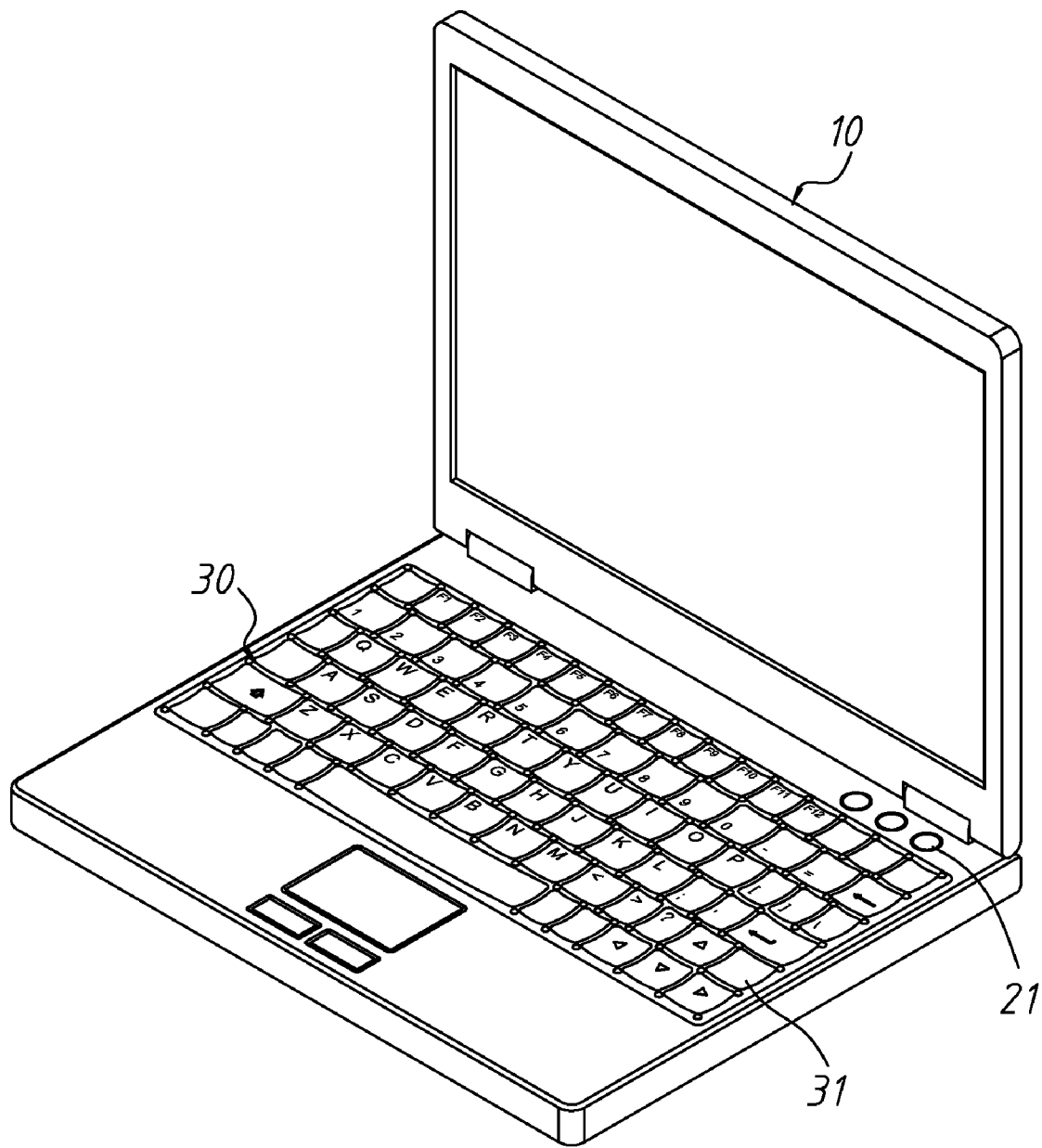

The key units 23 in the antecedent embodiment have multiple keycaps, so some gaps exist between the pressing portion 231 and the surrounding pressing portion 231. After used for a long time, the key units 23 have dust accumulated in the gaps. Therefore, referring to FIG. 6A and FIG. 6B which are schematic diagrams of another embodiment of the invention, the key units 23 are a type of a flexible panel 30. The flexible panel 30 is made of flexible material, such as polyethylene glycol terephthalate (PET), silica gel, or polyvinyl chloride (PVC) material. When the key units 23 are not used, the flexible panel 30 flatly abuts against the casing and keeps simple and plane appearance, and no gap exists therein (as shown in FIG. 6A). After used for a long time, the dust and dirt are not accumulated. When the key units 23 are used, pushed by the controlling switch 21, the pressing portion 21 protrudes out to be able to be pressed by a user (as shown in FIG. 6B).

Please refer to FIG. 7A and FIG. 7B. The flexible panel 30 flatly abuts against the casing 24, and no gap exists between the flexible panel 30 and the casing 24 to make the flexible panel 30 unable to be pressed. The flexible panel 30 has multiple contacting portions 32 at the bottom corresponding to the key switch 51 of the circuit board 50. The flexible panel 30 keeps an overall plane appearance at the time, and the position of the pressing portion 31 cannot be distinguished.

Corresponding protrusions 33 are disposed around the contacting portion 32, and the casing 24 has a corresponding through hole to allow protrusion 33 to extend out. The bottom of the contacting portion 32 slightly contacts the flexible dome 53 at the top of the key switch 51, and therefore, the flexible dome 53 is not deformed under the press and is not electrically connected with the key switch 51, and the key switch is not activated.

In the operation state, the protrusion 33 and the circuit board 50 are pushed upward to form the pressing distance via operating the controlling switch 21. As the flexible panel 30 is made of flexible material, the portion near the protrusion 33 is higher and the lower portion between two protrusions 33 forms the pressing portion 31 to allow the users to visually distinguish it. As showing in the figures, the bottom of the contacting portion 32 is a type of reversed hook to prevent the flexible panel 30 being separated from the casing 24 entirely. Furthermore, the circuit board 50 and the protrusion 33 are raised up together. Although the moving distance of the contacting portion 32 is shorter, the contacting portion 32 still cannot activate the flexible dome 53.

At the time, the user can press down the pressing portion 31 to make the contacting portion 32 press the flexible dome 53 and trigger the key switch 51 at the bottom to realize the corresponding function of the key or input the corresponding word or symbol. The flexible dome 53 provides resilience for the pressing portion 31 and the contacting portion 32. On the other hand, the top of the key switch 51 can further include a luminous source 52, which may be a light emitting diode (LED) or an electro luminescence (EL). The luminous source 52 emits light to indicate that the pressed keys are pressed or only to light the raised keys up. Words or symbols corresponding to the pressing portion 31 may be printed on the flexible panel 30, or only the luminous source is used to realize an indication function. The luminous source 52 also may be applied to the type of the above-mentioned keycap, and the grouping defined keys and the push element for raising the key units also can be applied in this embodiment. Unnecessary details are not described herein.

The keyboard module for avoiding accidental operation keyboard module disclosed in the invention can be applied in the keyboard module of the laptop and the desktop computer. In the inactive or standby state, the keys flatly abut against the casing of the keyboard module and are unable to be pressed. In the operation state, the keys are raised up, or some necessary keys corresponding to software are raised up to prevent the accidental operation caused by the users pressing other keys by mistake. The keyboard module can utilize the flexible panel to keep a plane appearance. The problems of pollution and dirtiness can be avoided because of the no-gap design.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A keyboard module for avoiding accidental operation comprising:
   a casing;
   a plurality of key units, each key unit having a pressing portion and a contacting portion extending downward thereof, and the pressing portion flush with the casing for the key unit not being pressed down;
   a push element, disposed under the key units, for pushing up the key units and to form a distance against the casing, when the pressing portion of each key unit is pressed, the contacting portion moves downward to execute a function corresponding to the key unit; and
   a controlling switch for controlling the push element, wherein the plurality of key units is a flexible panel and has a plurality of contacting portions at the bottom and a plurality of pressing portions at the top.

2. The keyboard module according to claim 1, wherein each key unit comprises a keycap, and the pressing portion and the contacting portion are defined on the keycap.

3. The keyboard module according to claim 2, wherein the plurality of key units are divided into a plurality of key groups, and the keycaps in the same key group are raised up by the push element.

4. The keyboard module according to claim 3, wherein the key units in the same key group are raised up by the push element.

5. The keyboard module according to claim 2, wherein the pressing portions of each keycaps have the same height when the keycaps are raised, and when the pressing portions are flush with the casing, each surface of the keycaps keeps even to a surface of the casing.

6. The keyboard module according to claim 1, further comprises a plurality of protrusions disposed near the contacting portions and pushed by the push element to rise up the flexible panel.

7. The keyboard module according to claim 1, further comprises a plurality of key symbols corresponding to the pressing portion are printed on the flexible panel.

8. The keyboard module according to claim 1, wherein the push element is a motor module.

9. The keyboard module according to claim 1, wherein the push element is a connecting rod.

10. The keyboard module according to claim 9, wherein the controlling switch is a push button connected with the connecting rod.

11. The keyboard module according to claim 1, wherein the controlling switch is a press switch.

12. The keyboard module according to claim 1, wherein the controlling switch is a touch switch.

13. The keyboard module according to claim 1, further comprises a luminous source to provide a luminous indication when each key unit is raised up.

* * * * *